United States Patent Office 3,058,481
Patented Oct. 16, 1962

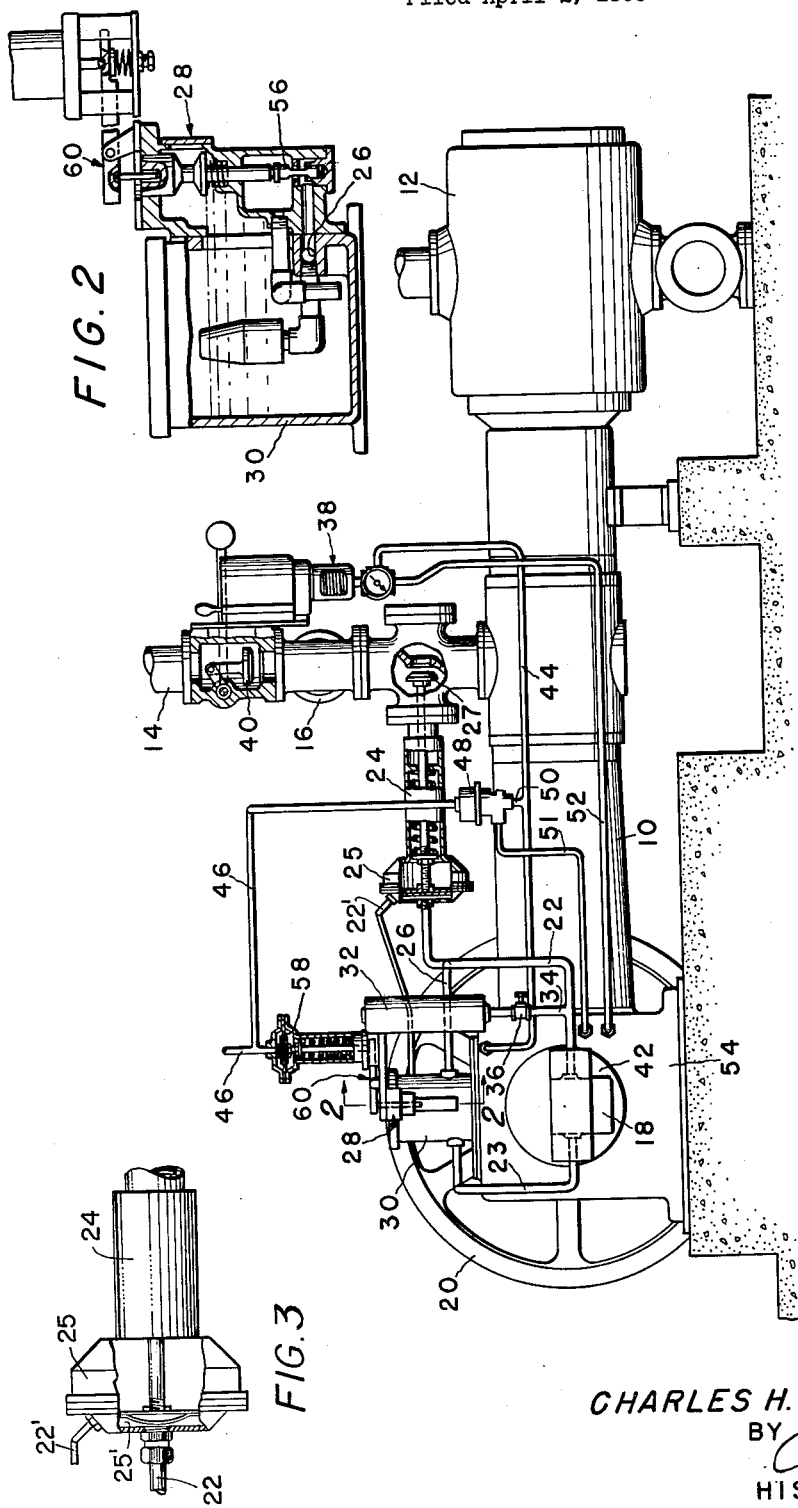

3,058,481
GOVERNOR AND SAFETY CONTROL
Charles H. Brunstetter, Phillipsburg, N.J., assignor to Ingersoll-Rand Company, New York, N.Y., a corporation of New Jersey
Filed Apr. 2, 1959, Ser. No. 803,629
2 Claims. (Cl. 137—28)

This invention relates in general to governing and safety devices, and more in particular to the speed and pressure controls for motor driven compressor units of the type in which the speed of the unit tends to fluctuate during each cycle thereof.

It is commonly known that with the present type speed governors for compressor units, in particular a reciprocating compressor unit equipped with a prime mover of the reciprocating type, the speed of the associated prime mover cannot be satisfactorily maintained at certain desired speeds. This is particularly apparent when the compressor unit is required to operate at speeds lower than the full load operational speed, under which conditions there is a tendency of "hunting," and, at relatively low speeds, the r.p.m. of the compressor may fluctuate substantially.

According to this invention a device has been produced to prevent such hunting. This device comprises means cooperating with the speed governor to moderate the actions of the speed governor, and to operate in response to the variations in speed of the prime mover.

Referring to safety devices for compressor units, it is to be noted, that, for accurate and reliable compressor performance, and particularly with respect to process work in which compressed air of, for example, 3–15 pounds per square inch pressure is used for instrument controls, the provision of a safety device for protection against failure of such instrument air is of paramount importance.

It is then the object of this invention to provide a device that cooperates with the speed governor, will reduce to a minimum the fluctuation in speed of the associated prime mover, and will maintain the speed of the unit substantially constant at any required speed demand on the compressor.

Another object of this invention is to provide a safety device by means of which the compressor unit is shut down when the pressure of the compressed air for the instrument controls falls below a predetermined limit.

These and other objects and advantages of this invention will more fully appear from the following description made in connection with the accompanying drawing, in which—

FIGURE 1 is a side view of a compressor driven by a driver and showing the devices in accordance with this invention, FIG. 2 is an elevational view having portions cut away of the oil reservoir with the control valve associated with the aforementioned devices, and FIG. 3 shows enlarged a portion of the diaphragm operated valve shown in FIG. 1.

Referring now more particularly to the drawings, 10 designates a commonly known type of reciprocating steam engine connected to drive a reciprocating compressor 12. A supply line 14 for steam with a hand operated throttle valve 16 is connected to the steam engine 10 to conduct steam thereto from a source of supply (not shown). A hydraulic speed governor system is provided to maintain the speed of the unit within limits, and to control the speed of the unit during changes in the air demand or whenever the steam pressure fluctuates.

A pump 18, here shown as a hydraulic pump, being connected to be driven by the main shaft (not shown) of the fly wheel 20 and the steam engine 10 and responsive to the speed thereof, delivers oil under pressure through a discharge line 22.

A control means, such as a diaphragm operated throttling valve 24, includes a valve 27 connected at its one end to the steam supply line 14 to control the supply of power to the motor, and a diaphragm 25, connected to means 22, shown as the discharge line 22, to receive a signal proportional to variations in rate of the discharge of the pump to control the motor speed. Specifically, the pressure of the oil in the discharge line 22 is transmitted to a diaphragm 25 of the control means, and, when the diaphragm 25 is actuated by the variations in the pressure of the oil in the discharge line 22, the diaphragm 25, being connected to a valve 27, will actuate the valve 27 to increase or decrease the flow of steam to the steam engine 10.

An oil reservoir 30 is connected to the pump 18 through an intake line 23, the oil being pumped by the pump 18 through the discharge line 22 to the diaphragm 25 through a diaphragm pressure chamber 25' of the valve 24, and into a branch line 26 which conducts the oil through a restricting device 28 into the reservoir 30. A bleed line 22', connected to the upper end portion of diaphragm pressure chamber 25' of diaphragm operated valve 24 as shown in FIG. 3, communicates oil reservoir 30 with diaphragm chamber 25' to continuously circulate a small amount of oil and air off the upper portion of diaphragm chamber 25', preventing any accumulation of air therein.

Any variations in the speed of the compressor, due to, such as, changes in air demand on the compressor 12, causes a change in the speed of the pump 18 which change is signalled to the control means or diaphragm operated throttle valve 24. As the oil from the pump 18 is conducted through the branch line 26 of the discharge line 22 through a restricting device 28 into the reservoir 30, the pressure of the oil in the discharge line 22 will vary in proportion to the speed of the pump 18. The restricting device 28 comprises a variable volume by-pass valve 56, the rate of bleed-off through this variable volume by-pass valve determining the pressure of the oil in the discharge line 22, as will appear more detailed hereinafter in connection with the description of the safety device. Whenever the speed of the compressor 12 or steam engine 10 is changed, the speed of the pump 18 will also change, and consequently, the pressure in the discharge line 22 will vary, causing the diaphragm 25 of the valve 24 to be actuated in accordance with such variations in pressure to move the valve 27 in the supply line 14 to restore the original speed of the steam engine 10 and the compressor 12.

It is commonly known that during each revolution of the crankshaft of a piston engine, the speed thereof is varied, and, that this fluctuation of speed is opposed and moderated by the inertia of the associated fly wheel. In particular when the engine is of a single piston type, the fly wheel inertia at low speeds is such that it will not moderate the fluctuation of the speed of the crankshaft during each revolution as it would when that speed would be higher. At relatively low speeds, when using a common type speed governor, the engine will fall into a state of speed oscillation or hunting, and, as this "hunting" of the compressor unit is obviously objectionable, according to this invention, a device is produced to cooperate with the speed governor system to avoid such hunting. Accordingly there is provided means operatively connected to the control means, the diaphragm operated throttle valve 24, to moderate or delay the pressure variations of the pump discharge transmitted to the diaphragm operated throttle valve 24.

The aforementioned means, cooperating with the speed governor system, comprises an air tank 32, being a common air chamber, connected to the discharge line 22 by a branch line 34, and a choke valve 36 in the branch line 34 between the tank 32 and the discharge line 22. It is to be noted that the choke valve 36 is adapted to permit the oil from the pump 18 to flow freely from the discharge line 22 into the air chamber 32, but, to restrict the flow of such oil from the air chamber 32 to the discharge line 22.

When the compressor unit is operating, the pressure of the oil in the discharge line 22 will cause the air in the air tank 32 to be compressed, and the tank 32 will be partly filled with oil. It is to be noted that the air chamber 32 could be substituted by a cylinder and a spring loaded piston arrangement to achieve the same effect.

The variation of the speed of the fly wheel 20 during each of its revolutions, this variation of speed being substantial when the compressor is required to operate at a relatively low speed, will be reflected in the speed of the pump 18. When the speed of the pump 18 is for instance increased, the pressure in the discharge line 22 will be increased, but, before this increase of pressure is transmitted to the diaphragm 25 of the valve 24, the valve 36 will permit the additional oil that is pumped by the pump 18 to flow freely from the discharge line 22 through the line 34 into the air chamber 32 to compress the air therein. In other words, the increase of the pressure in the discharge line 22 will be cushioned by the air in the air chamber 32. As the valve 36 is adapted to restrict the flow of oil from the air chamber 32 to the discharge line 22, the oil from the air chamber 32 is released slowly to permit a comparatively slow change of position of the diaphragm 25 of the valve 24 to correspondingly adjust the position of the valve 27, the speed of the steam engine 10 and the compressor 12.

When the speed of the pump 18 is decreased, and the pressure of the oil in the discharge line 22 is decreased, the oil in the air chamber 32, having a higher pressure than the oil in the discharge line 22 because of the restriction of the flow of the oil from the air chamber 32 into the discharge line 22 by the valve 36, will be slowly released from the air chamber 32 and gradually added to the oil in the discharge line 22 to permit a comparatively slow change of position of the diaphragm 25 of the valve 24 and correspondingly adjust the speed of the steam engine 10 and the compressor 12.

With the arrangement of the air chamber 32 and the choke valve 36 in the discharge line 22, the variation of speed of the fly wheel during each of its revolutions will effect a moderation of the actions of the speed governor system and a corresponding adjustment of the diaphragm 25 and the valve 27 to moderately restore the original speed of the fly wheel and that of the compressor unit. This ensures for every speed of the fly wheel, during each of its revolutions, a more positive position of the valve 27 to permit a more steady flow of steam to the prime mover of the compressor unit.

Cooperating with the aforementioned speed governor system of the compressor unit, according to this invention, a safety device has been produced to shut down the prime mover of the compressor unit in case of failure of the instrument control air pressure. This safety device is connected to a lubricant failure shut down device, the latter being a part of the standard lubricating system of the compressor unit.

The compressor unit is equipped with a conventional type force feed lubricating system to lubricate the steam engine 10, as well as the compressor 12, and, as a protection against low lubricating oil pressure, a conventional type trip mechanism 38 is provided to actuate a safety shut off valve 40 in the supply line 14. A lubricating pump 42, connected to and driven by the steam engine to supply lubrication for the steam engine 10 and compressor 12, is connected through a line 44 with the trip mechanism 38, and, whenever the pressure of the lubricating oil in the line 44 falls below a predetermined limit, the trip mechanism 38 will act to cause the safety shut off valve 40 to be tripped and to stop the flow of steam to the steam engine 10.

Referring now to the aforementioned safety device, the instrument control air pressure failure device, a means has been provided to lower the pressure in the lubricating oil line 44 in order to operate the trip mechanism 38 and the safety shut off valve 40 whenever there is a failure in the supply of instrument control air. This means includes an unloader valve 48 of the conventional type which is connected to the lubricating oil line 44 through a branch line 50. An air line 46, connected to the supply of instrument control air (not shown), conducts instrument air to a diaphragm 58 which actuates, by means of a lever system 60, the valve 56 of the restricting device 28 of the speed governing system to control the pressure in the discharge line 22 and the speed of the unit. The air line 46 also conducts instrument air to the unloader valve 48, the unloader valve 48 being adapted to close off the branch line 50 when the pressure of the instrument air in the instrument air line 46 is between predetermined operational limits. When, however, the pressure in the instrument air line 46 drops below a predetermined limit, the unloader valve 48 is adapted to open the branch line 50 to lower the pressure in the lubricating oil line 44 and thereby, as the pressure in the line 44 drops below a predetermined limit, effecting the trip mechanism 38 to trip the safety shut off valve 40 to stop the flow of steam to the steam engine 10. A line 52 connects the trip mechanism 38 with the sump 54 of the steam engine 10. When the unloader valve 48 lowers the pressure in the lubricating oil line 44, the oil therein is conducted through a line 51 into the sump 54 of the steam engine 10 from where the oil can be recirculated.

With this arrangement the safety shut off valve 40 will be tripped not only when the pressure of the lubricating oil drops below a predetermined limit, but also when there is a failure in the supply of instrument air to the associated instrument controls.

In this manner a safety device has been added to the regulating and protective devices of the compressor unit to provide more protection and a more reliable operation thereof.

It should be understood that the description and drawing herein are illustrative only, and that various changes and modifications may be made in the structure disclosed without departing from the spirit of the invention.

I claim:

1. A safety device for a motor driven compressor unit comprising, a power supply connected to operate said motor, a lubricating system including a lubricating pump operatively connected to supply lubricant to the unit, a line connected to the pump discharge, a lubricant failure shut-down device having a connection with said line adapted to be operated when the pressure of the pump discharge is below a predetermined limit to cut off the power supply to said motor, a speed governing system operatively connected to and responsive to the speed of said unit to control the speed of said unit, a control device connected to control said speed governing system, pressure fluid supply means to supply pressure fluid to operate said control device, and means connected to said line and operated when the pressure of such pressure fluid is below a preset limit to lower the pressure in said line below said predetermined limit to operate said lubricant failure shut-down device.

2. The device claimed in claim 1 in which the last said means comprises an unloader valve connected to be operated by fluid from the pressure fluid supply means.

References Cited in the file of this patent

UNITED STATES PATENTS

| | | |
|---|---|---|
| 198,233 | Wythe | Dec. 18, 1877 |
| 902,001 | Rateau | Oct. 27, 1908 |
| 905,332 | Levilly | Dec. 1, 1908 |
| 1,278,160 | Jones et al. | Sept. 10, 1918 |
| 1,358,812 | Anderson | Nov. 16, 1920 |
| 1,931,104 | Caughey | Oct. 17, 1933 |
| 2,172,642 | Sherriff | Sept. 12, 1939 |
| 2,224,321 | Schwender | Dec. 10, 1940 |
| 2,801,067 | Mercier | July 30, 1957 |
| 2,854,964 | Wagner | Oct. 7, 1958 |
| 2,878,834 | Mercier | Mar. 24, 1959 |